United States Patent

Durand et al.

[11] Patent Number: 5,459,399
[45] Date of Patent: Oct. 17, 1995

[54] TRAP FOR PREVENTING MIXING OF FLUX BETWEEN ADJACENT INDICIA AND BEING DISPOSED ADJACENT FIRST AND SECOND SENSORS

[75] Inventors: Christophe Durand; Gerard Sirigu, both of Gien, France

[73] Assignee: Otis Elevator Company, Farmington, Conn.

[21] Appl. No.: 255,595

[22] Filed: Jun. 8, 1994

[51] Int. Cl.[6] .................. G01B 7/14; B66B 3/02
[52] U.S. Cl. ............ 324/207.24; 187/394; 324/207.12
[58] Field of Search .............. 324/207.13, 207.15, 324/207.2, 207.24, 207.26, 260, 262, 207.12; 187/393, 394

[56] References Cited

U.S. PATENT DOCUMENTS

| | | | |
|---|---|---|---|
| 3,425,515 | 2/1969 | McDonald et al. | 187/394 |
| 5,166,614 | 11/1992 | Yokosawa et al. | 324/248 |
| 5,293,117 | 3/1994 | Hwang | 324/242 |
| 5,351,004 | 9/1994 | Daniels et al. | 324/207.13 |

FOREIGN PATENT DOCUMENTS 53-93547  1/1978  Japan ........................ 187/394

*Primary Examiner*—Walter E. Snow
*Assistant Examiner*—Roger Phillips

[57] ABSTRACT

The sensitivity of a magnetic detector (17) sensing flux (23) from a source (14) is improved by isolating the magnetic detector (17) from flux (24a) of an adjacent source (13a) by means of a magnetic trap (33).

4 Claims, 2 Drawing Sheets

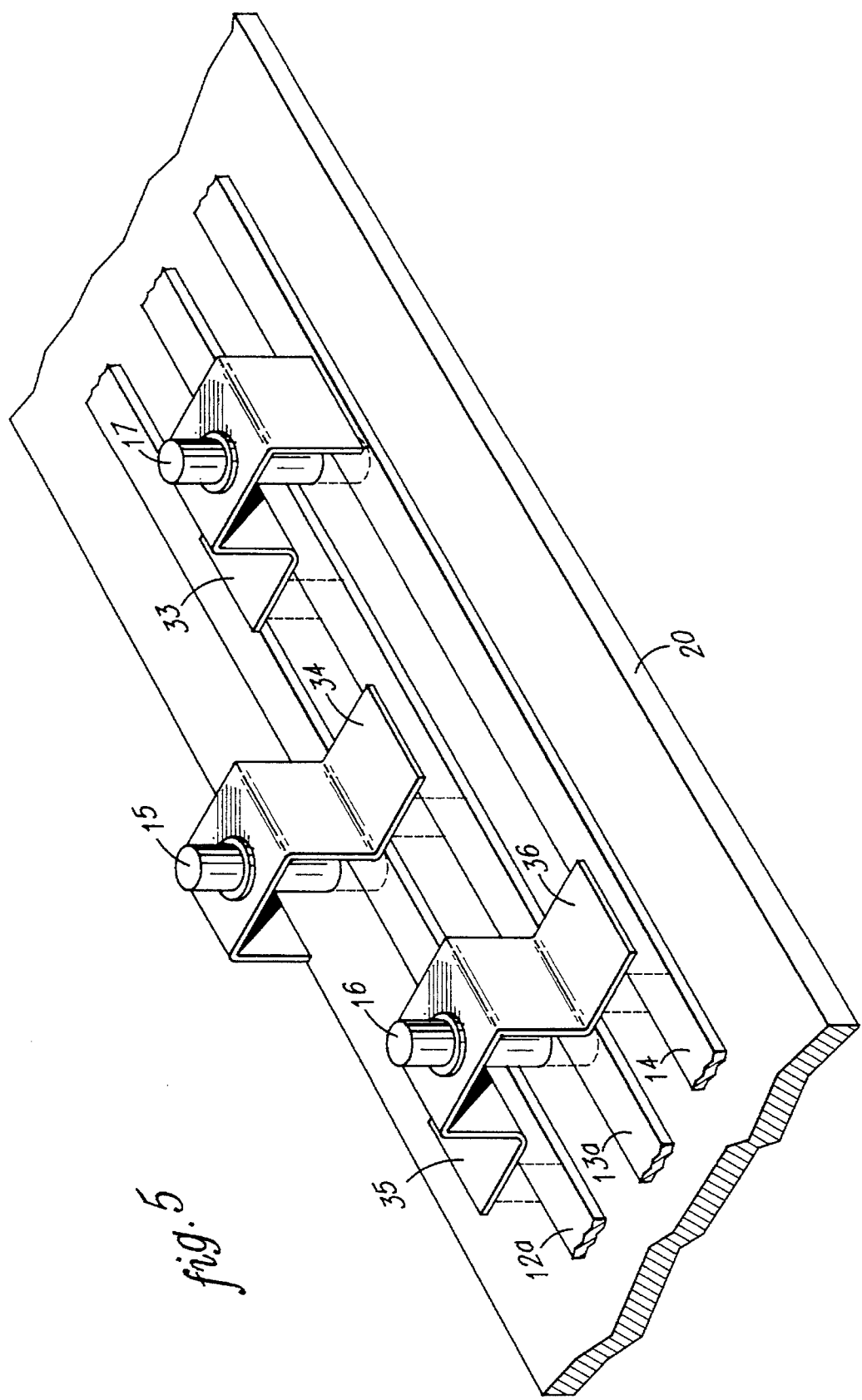

TRAP FOR PREVENTING MIXING OF FLUX BETWEEN ADJACENT INDICIA AND BEING DISPOSED ADJACENT FIRST AND SECOND SENSORS

TECHNICAL FIELD

This invention relates to shielding a magnetic detector from magnetic fields adjacent to magnetic fields to be sensed thereby, by means of a magnetic trap which confines the flux away from the field to be sensed.

BACKGROUND ART

There are many industrial applications where relative positioning of two objects may be sensed by means of magnetic fields. One example is the precise vertical position of an elevator car within an elevator hoistway, shown in FIG. 1. Magnetic strips 12–14 on the wall of the hoistway in the vicinity of each floor landing provide an indication of when the elevator car is within the outer landing zone (12), the inner landing zone (13), and the leveling zone (14), respectively. The magnetic fields of the strips are sensed by corresponding magnetic detectors 15–17. These are shown in FIG. 1 as not being aligned in a row, but rather as being displaced from each other for ease of mounting and to reduce interference; the magnetic strips 12–15 are similarly disposed. The magnetic detectors 15–17 are shown centrally disposed on the magnetic strips 12–14 in the position they have when the elevator is perfectly aligned at the leveling zone of the related floor landing. A set of dotted circles 15a–17a show the position of the three magnetic detectors as an elevator car travels downwardly and first reaches the outer landing zone. Another set of dotted circles 15b–17b show the position of the magnetic detectors 15–17 as the elevator car travels further downwardly and first enters the inner landing zone and first senses the magnetic strip 13. The magnetic strips 12–14 may be mounted together on a sheet of magnetic material 20 which may be disposed on the hoistway wall.

In FIG. 2, the magnetic detector 17 is shown disposed on an elevator car 21 by means of a bracket 22 which is broken away for simplicity. The magnetic strips 13, 14 are also shown disposed on the sheet 20. Not shown in FIG. 2 (for simplicity) is the magnetic detector 16 (which would be similarly mounted on a portion of the bracket 22, or another bracket, in alignment with the magnetic strip 13) and the magnetic strip 12 and its magnetic detector 15 (which would be disposed to the left as seen in FIG. 2). The magnetic detectors 15–17 may typically comprise magnetically actuated microswitches, sometimes called "reed relays", or other suitable sensors As seen in FIG. 2, the flux from the magnetic strip 14 is attracted to the structure of the magnetic detector 17, which helps to define its path, and thus causes rather confined flux lines, indicated by the dotted lines 23. As depicted in FIG. 2, for example, the flux lines are seen to leave the south pole of the magnetic strip 14 and have an upward sense indicated by arrows in FIG. 2, and then return in an outer path, with a downward sense indicated by arrows. The problem is that the flux of an upward sense from the south pole of the magnetic strip 13 has a downward sense in the vicinity of the magnetic detector 17, which attracts the flux lines, and causes them to interfere in an opposite sense, as indicated by solid lines 24. Having flux of opposite sense in the vicinity of the detector 17 reduces its sensitivity. This interference reduces the ability of the detector 16 to sense the presence of a magnetic strip, as is illustrated in FIG. 3.

In FIG. 3, a dash line 27 indicates a point at which a magnetic detector 28 is about to detect the commencement of a magnetic strip 29. But since it is between two magnetic strips 30, 31, which (according to the convention of FIG. 2) cause downward flux, the sensitivity of the detector 28 in detecting the commencement of the magnetic strip 29 is much reduced. As a result of the phenomena illustrated in FIGS. 2 and 3, it is necessary to keep the strips 12–14 separated from each other by a sufficient amount so that the amount of interfering flux illustrated by the lines 24 (FIG. 2) is minimal and does not unduly interfere with the magnetic detector 17 sensing the presence or absence of the flux lines 23 from the magnetic strip 14. Signals indicative of the magnetic indicia sensed by the magnetic detector 17 are provided by electrical conductors 25 to circuitry (not shown), all in the well-known manner.

DISCLOSURE OF INVENTION

Objects of the invention include providing for the independent detection of the presence or absence of a plurality of magnetic indicia which are located closely together, reducing the spacing of indicia and/or increasing the strengths of fields which may be employed in a system for sensing the presence or absence of magnetic indicia, and improving the sensitivity of magnetic detection.

This invention is predicated in part on the concept that providing a magnetic shield around a magnetic detector which is to detect the presence or absence of moving magnetic indicia can itself reduce the sensitivity, that is, the sharpness and excursion of response of the detector to the presence and absence, respectively, of the magnetic indicia.

According to the present invention, the sensitivity of a plurality of magnetic detectors, each for sensing related magnetic indicia which are adjacent to the magnetic indicia corresponding to another of said detectors, is improved by means of each detector having a magnetic trap to guide the magnetic flux of adjacent magnetic indicia in a confined path that does not interfere with the flux of the indicia which is to be sensed by the magnetic detector.

By providing a trap for each of the magnetic detectors, each detector is shielded from the flux of adjacent magnetic indicia, without in any way affecting the ability of each detector to sense the flux of its corresponding magnetic indicia.

The invention is readily implemented in a wide variety of forms to suit any particular manner in which the invention may be used.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 5 is a partial perspective view of a plurality of adjacent magnetic detectors employing magnetic traps in accordance with the present invention.

BEST MODE FOR CARRYING OUT THE INVENTION

Figure 1:
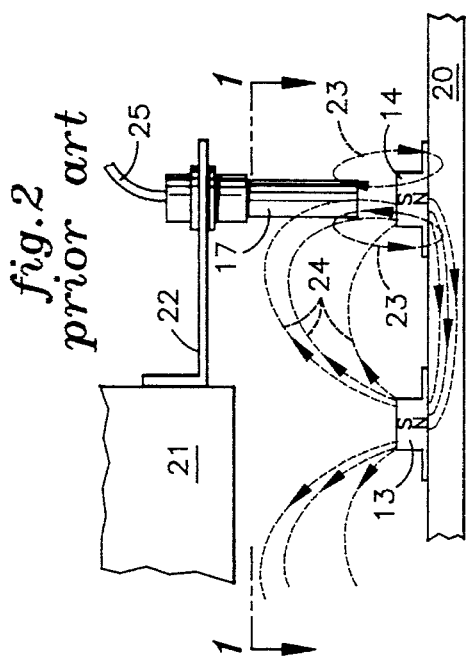
FIG. 1 is a side elevation view of prior art magnetic indicia disposed, for instance, on the wall of an elevator hoistway, partly in section taken on the line 1—1 of FIG. 2.
Figure 3:
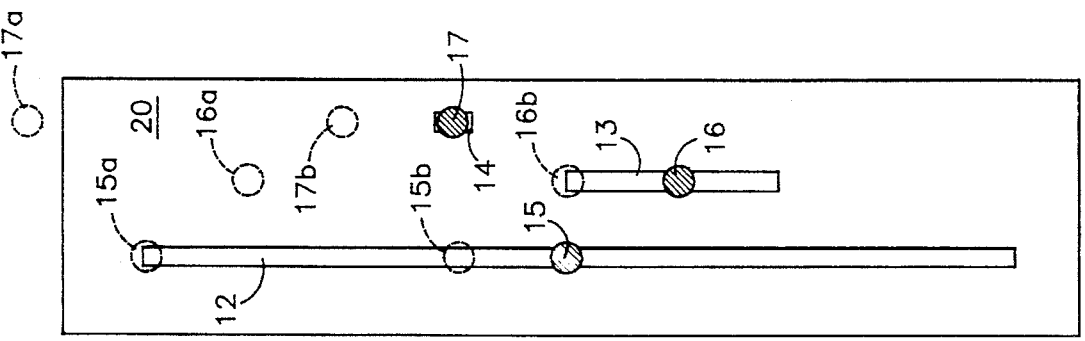
FIG. 3 is an illustration of additional magnetic indicia of the prior art.
Figure 2:
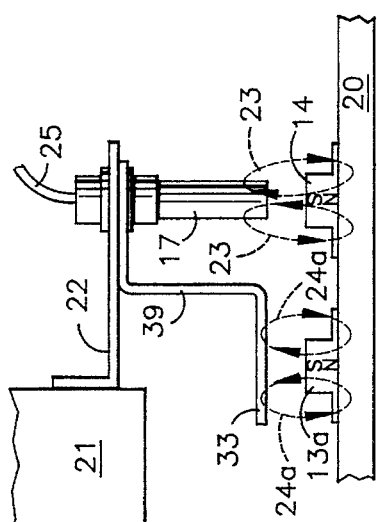
FIG. 2 is a partial bottom plan view of the indicia of FIG. 1 and a magnetic detector.
Figure 4:
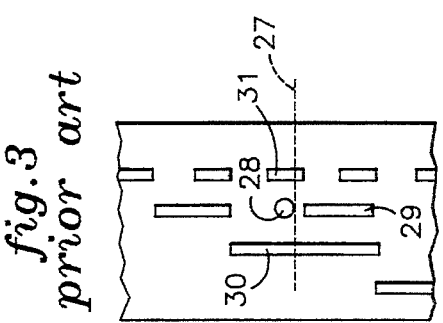
FIG. 4 is a partial, bottom plan view of a magnetic detector employing a magnetic trap according to the present invention.

Referring now to FIG. 4, a magnetic trap 33 according to the invention attracts flux from a magnetic strip 13a and causes the flux to traverse a relatively confined path as shown by the dotted arrows 24a. It has been found that confining the path of flux by means of the trap 33 allows spacing strips 13a, 14 at about one-half the distance which is required when the trap 33 is not used in order to avoid interference between the strip 13 and the magnetic detector 17 (FIG. 2). Alternatively, much stronger magnetic fields can be used in strips located the same distance as strips of the prior art. The trap 33 can be made out of any material having high magnetic permeability, such as iron, mild steel, or any artificial composition having high magnetic permeability.

In FIG. 5, the three magnetic detectors 15–17 are shown, for clarity, without any mounting bracket 22, and without electrical conductors 25. In FIG. 5, the dotted lines indicate how each of the detectors 15–17 responds to a corresponding magnetic strip 12a, 13a, 14, and the dotted lines also indicate how each of the magnetic traps 33–36 interact with the magnetic strips 12a, 13a, 14 adjacent to the related magnetic detector. For instance, the trap 33 confines the magnetic field (or flux) from the strip 13a so that it will not interfere with the magnetic detector 17 sensing the fields of the strip 14. Similarly, the magnetic trap 34 confines the magnetic fields from the magnetic strip 13a so as not to interfere with the magnetic detector 15 as it senses magnetic fields of the magnetic strip 12a. Similarly, the detector 16 is shielded from the magnetic fields of the magnetic strips 12a and 14 by virtue of its related magnetic traps 35, 36. It is clear that the magnetic strips 12a and 13a can be disposed closer to the strip 14 and to each other without causing interference, compared to spacing of the strips 12, 13 in the prior art. Having the magnetic detectors 15–17 oriented other than in a single row transverse to the relative motion of magnetic indicia which they are to sense allows the trap 33 of one detector 17 to confine the magnetic field of one of the magnetic indicia 13a without having any effect whatsoever on the manner in which another magnetic detector 16 will sense the magnetic field of the magnetic indicia 13a.

As used herein, the term "magnetic trap" means a device which confines the magnetic flux to a limited volume immediately adjacent a source of magnetic flux (as shown in FIG. 4), thereby making it unnecessary to shield any detector, which is outside of that volume, from such flux.

As seen in FIGS. 4 and 5, the trap 33 is disposed in a position about the same distance away from the magnetic strips as the end of the magnetic detector 17. However, the exact position of a trap 33–36 with respect to the corresponding strip 14, 13a, 12a can be adjusted to suit any use to which the invention is to be put. Similarly, as shown in the disclosed embodiment, right angle portions 39 of the traps 33–36 may be disposed midway between adjacent strips 12a, 13a; 13a, 14. However, the spacing may be altered to suit any manner in which the present invention is used, so long as it provides an adequate trap for the unwanted magnetic flux 24a (FIG. 4) and does not unduly interfere with the flux 23 which is desired to be sensed.

In the disclosed embodiment, a pattern of magnetic indicia 12–14, 39-31 have been used as examples. However, the invention is useful in any case where magnetic indicia are relatively movable with respect to magnetic detectors, the relative motion causing the detector of one set of indicia to pass near another set of indicia, thereby experiencing interfering magnetic flux, as described hereinbefore. This will always be true except in a case where the indicia are never near each other when one of them is sensed, such as two discrete spots of magnetism not disposed adjacent each other along the path of motion. In the disclosed embodiment, the indicia 12a, 13a, 14 are fixed (such as on the hoistway wall) and the magnetic detectors 15–17 are movable (being disposed on an elevator car). However, the invention can obviously be practiced in the opposite sense: the detectors may be fixed and the magnetic indicia may be movable, in any application where such an arrangement is to be preferred. The traps herein are shown in the form resembling angle brackets. However, they could be in any form so long as high magnetic permeability material is placed in the position to confine the flux of adjacent indicia so as to not interfere with the intended detection, as described. The invention may be utilized to improve sensitivity in sensing any adjacent sources of magnetic flux, in industrial applications other than elevators.

Thus, although the invention has been shown and described with respect to exemplary embodiments thereof, it should be understood by those skilled in the art that the foregoing and various other changes, omissions and additions may be made therein and thereto without departing from the spirit and scope of the invention.

We claim:

1. A system having a plurality of magnetic detectors for respectively sensing the presence of a plurality of corresponding magnetic indicia, comprising:

a pair of objects which are relatively movable with respect to each other;

a plurality of said magnetic indicia disposed on a first one of said objects, including first indicia disposed along a first line parallel to the relative motion between said objects and second indicia disposed along a second line parallel to the relative motion between said objects and adjacent and parallel to said first line;

a plurality of said magnetic detectors disposed on a second one of said objects, each of said detectors disposed to sense magnetic flux of corresponding indicia along one of said lines, including a first detector disposed to sense said first indicia and a second detector disposed to sense said second indicia;

wherein the improvement comprises:

a plurality of magnetic traps, each disposed adjacent to a corresponding one of said detectors for confining the path of magnetic flux of the indicia of an adjacent one of said lines, including a first trap disposed adjacent to said first detector to confine the magnetic flux of said second indicia to a limited volume adjacent to said second indicia and exclusive of said first detector, and a second trap disposed adjacent to said second detector to confine the magnetic flux of said first indicia to a limited volume adjacent to said first indicia and exclusive of said second detector, whereby each detector senses the magnetic flux of the corresponding indicia without interference from flux of adjacent indicia.

2. A system according to claim 1 wherein said trap comprises a sheet of material having high magnetic permeability.

3. A system according to claim 2 wherein said trap comprises a sheet of steel.

4. A system according to claim 1 wherein each of said traps is disposed from the indicia for which it is a trap by a distance which is about substantially the same as the distance of the related detector from the indicia which said detector is to sense.

* * * * *